US006947179B2

(12) United States Patent
Cordery et al.

(10) Patent No.: US 6,947,179 B2
(45) Date of Patent: Sep. 20, 2005

(54) METHOD FOR DETERMINING THE INFORMATION CAPACITY OF A PAPER CHANNEL AND FOR DESIGNING OR SELECTING A SET OF BITMAPS REPRESENTATIVE OF SYMBOLS TO BE PRINTED ON SAID CHANNEL

(75) Inventors: Robert A. Cordery, Danbury, CT (US); Claude Zeller, Monroe, CT (US); Mark Lanin, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 965 days.

(21) Appl. No.: 09/750,262

(22) Filed: Dec. 28, 2000

(65) Prior Publication Data

US 2002/0122196 A1 Sep. 5, 2002

(51) Int. Cl.[7] .................................................. H04N 1/40
(52) U.S. Cl. ..................................... 358/3.26; 358/1.15
(58) Field of Search ................ 358/1.2, 1.9, 1.15–1.16, 358/3.26, 2.1

(56) References Cited

U.S. PATENT DOCUMENTS

| 4,882,733 A | | 11/1989 | Tanner | |
| 5,180,357 A | | 1/1993 | Marzullo | |
| 5,189,521 A | | 2/1993 | Ohtsubo et al. | 358/296 |
| 5,278,918 A | | 1/1994 | Bernzott et al. | 382/9 |
| 5,447,378 A | | 9/1995 | Otsuka et al. | 400/61 |
| 5,566,252 A | * | 10/1996 | Miyaza | 382/298 |
| 5,568,383 A | * | 10/1996 | Johnson et al. | 704/2 |
| 5,596,353 A | | 1/1997 | Takada et al. | 347/19 |
| 5,619,307 A | | 4/1997 | Machino et al. | 399/11 |
| 5,754,695 A | * | 5/1998 | Kuo et al. | 382/228 |
| 6,183,406 B1 | | 2/2001 | Barrus et al. | |
| 6,636,990 B1 | * | 10/2003 | Wadewitz | 714/48 |

OTHER PUBLICATIONS

K J. Hintz and E. S. McVey; Multi–Process Constrained Estimation, IEEE Transactions on Systems, Man, & Cybernetics.

* cited by examiner

*Primary Examiner*—Thomas D. Lee
*Assistant Examiner*—Stephen Brinich
(74) *Attorney, Agent, or Firm*—Ronald Reichman; Angelo N. Chaclas

(57) ABSTRACT

A method for determining the information loss or conditional entropy in a paper channel where an imager produces an output from symbols printed on a substrate and a paper channel designed in accordance with such method. A parametric, statistical model of the channel is chosen. Test patterns are then transmitted through the channel to determine optimal parameter values for the model. These values are the used in the model to estimate the information loss in the channel. This information loss is used as a figure of merit in making design choices for the paper channel.

20 Claims, 5 Drawing Sheets

METHOD FOR DETERMINING THE INFORMATION CAPACITY OF A PAPER CHANNEL AND FOR DESIGNING OR SELECTING A SET OF BITMAPS REPRESENTATIVE OF SYMBOLS TO BE PRINTED ON SAID CHANNEL

BACKGROUND OF THE INVENTION

The subject invention relates to a method for determining the information capacity of a printed symbol communications channel. More particularly, it relates to measurement of the information capacity of a paper channel including a symbol input defining symbols to be printed, a bitmap generator responsive to said symbol input to generate input bitmaps representative of corresponding input symbols, a printer responsive to said input bitmaps to produce printed symbols substantially determined by said bitmaps on a substrate, and an imager to capture images of said printed symbols from said substrate and generate corresponding image signals.

As used herein the term "paper channel" refers to a communications channel, part of a complete communications channel, where information is input as a sequence of symbols; the sequence is coded, typically by a bitmap generator, as a corresponding arrangement of symbols, which are printed on a substrate; and, the substrate is scanned to generate an image signal (hereinafter sometimes "image") as output of the paper channel. Typically, the image signal is then processed by a recognition system to determine the input symbol sequence. The input symbol sequence can also incorporate redundancies so that an error correction system can process the output of the character recognition system to recover more accurately the input symbol sequence.

The complete communication system, sometimes referred to herein as the printed symbol communications channel, from input to recovery of the symbol thus involves the paper channel and the recognition system and possibly an error correction system. The information capacity of the complete channel is limited by the capacity of the paper channel. However the limitations of the paper channel can be masked by the effects of the recognition system and error correction system. Thus, for example, when evaluating a bar code printer it can be difficult to separate the effects of the recognition and error correction systems from the print quality characteristics of the paper channel. Particularly, effects of changes in the coding of the bar code generator (i.e.graphic design of the symbols) can be difficult to identify. System developers can be misled by experiments performed with a paper channel and an imperfect recognition system. For example, a change in the bar code generator coding that reduces the paper channel information capacity can show improved overall reading. Thus, the problem of optimizing the whole system is subverted by accepting a change which improves the matching to a to suboptimum recognition system.

The term "bitmap" as used herein refers to the ideal or nominal symbol design which is stored in and sent to the printer from the "bitmap generator". Actual storage of the "bitmap" can be in any convenient form such as an actual bitmap, line art, or simply a signal to print a particular symbol such as occurs with a line printer. Where an actual bitmap is stored, resolution of the stored bitmap and the scanned image need not be the same. Whatever form the actual storage of the symbol design takes, for purposes of the following analysis it is assumed, without loss of generality, to be transformed into a lattice of pixel values, i.e., an actual bitmap, having the same resolution as the scanned image.

Thus, it is an object of the subject invention to provide a method for evaluating the information capacity of a paper channel and the effects of design changes on that capacity.

BRIEF SUMMARY OF THE INVENTION

The above object is achieved and the disadvantages of the prior art are overcome in accordance with the subject invention by a method and a paper channel designed according to that method where the information loss, or conditional entropy, of a paper channel, the paper channel including; a symbol input defining symbols to be printed, a bitmap generator responsive to the symbol input to generate bitmaps representative of corresponding input symbols, a printer responsive to the bitmap generator to print on a substrate symbol images substantially determined by the bitmaps, and an imager to capture images from the substrate and generate corresponding image signals, where the method includes the steps of: selecting a general, parametric, statistical model for the paper channel; selecting a plurality of test bitmaps; transmitting the test bitmaps through the paper channel to obtain a set of test image signals for each of the symbols, each of the sets containing at least one test image signal; adjusting parameters of the model so that image signals predicted by said model for the set of test bitmaps substantially conform to the sets of test image signals, so that a particular parameterization of said model substantially accurately describing said paper channel is obtained; and determining an estimate for the information loss of the channel in accordance with said particular parameterization.

In accordance with one aspect of the subject invention, the model is defined in terms of a random variable S representative of a scanned image on a lattice corresponding to a print field, and a second random variable B corresponding to a bitmap input to said paper channel; and wherein said random variable S takes on values $s^i_j$ at points j in said lattice, where i labels an image selected from a set of possible images, and wherein said random variable B takes on values $b^j_c$ at points j in said lattice, where c labels a symbol selected from a set of said symbols to be printed.

In accordance with another aspect of the subject invention, the estimate for the information loss of the channel is determined by the further steps of: selecting one of the symbols to be printed from at least a subset of the symbols to be printed, and, for a predetermined number of iterations; computing a random value for an image signal in accordance with a conditional probability distribution for the image signals assuming the is selected symbol, said conditional probability distribution being determined by the particular parameterization; for the selected symbol determining, in accordance with the particular parameterization, a conditional probability of the selected symbol, assuming the computed random output image value; over the predetermined number of iterations, determining the mean conditional entropy, or information loss in transmitting the selected symbol over said paper channel, as a function of the conditional probabilities determined in sub-step f2) repeating these steps for all remaining ones of the subset of symbols to be printed; and averaging the conditional entropies determined over all of said test symbols to determine an approximate measure of the channel entropy, or information loss in bits per printed symbol.

In accordance with another aspect of the subject invention, a design for, or composition of, a component of a paper channel, the paper channel component being: a bitmap generator responsive to the symbol input to generate bitmaps selected from a stored set of bitmaps and representative of corresponding input symbols; a printer responsive to the bitmap generator to print on a substrate symbol images substantially determined by the bitmaps; an imager to capture the images from the substrate and generate corresponding image signals; the substrate; an ink used by the printer; or the set of bitmaps; by the steps of: determining an average information loss per symbol when a first design or composition is used for the component; comparing the average information loss per symbol for the first design or composition with a previously determined average information loss per symbol when a previous design or composition is used for said component; and selecting whichever of said designs or compositions has the lower average information loss per symbol.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
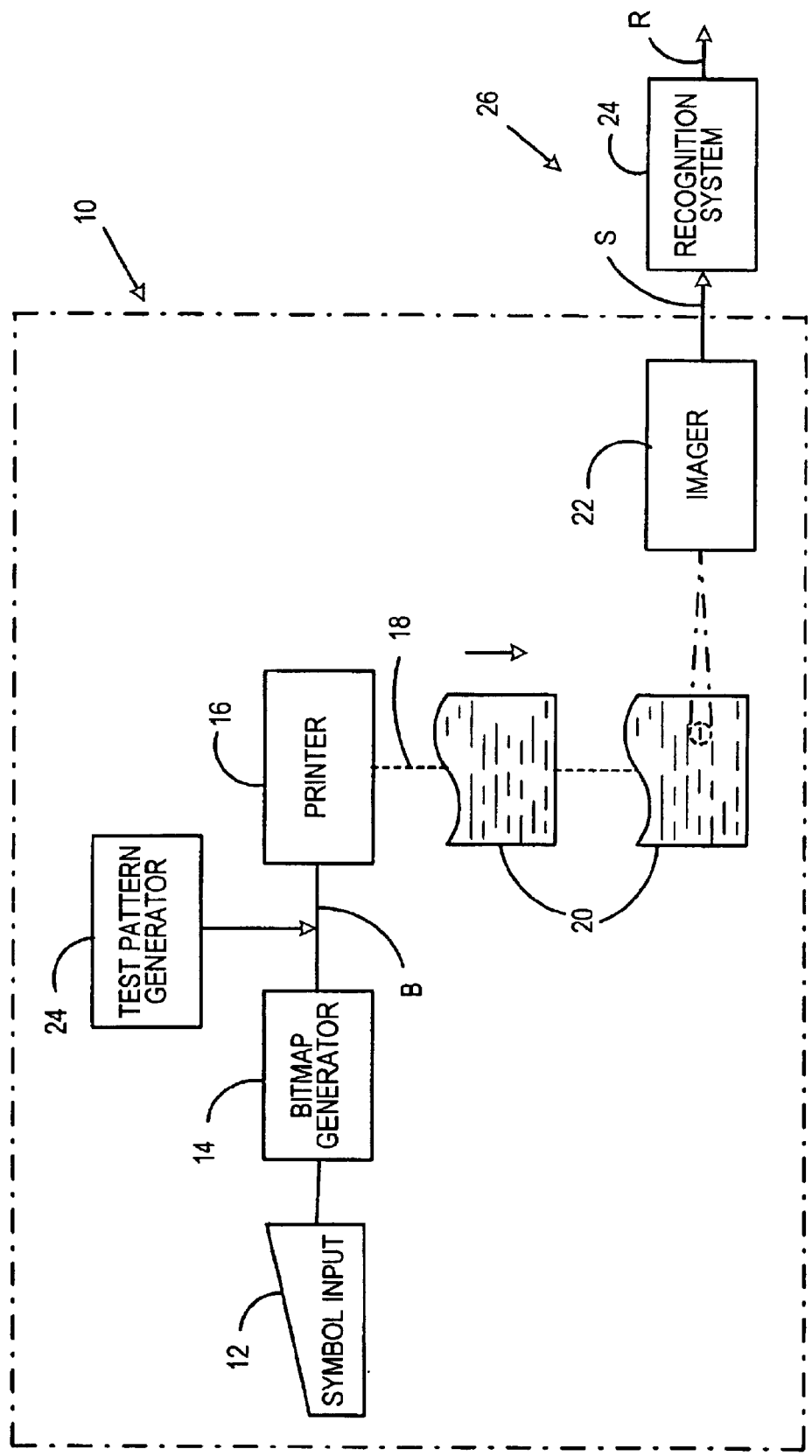
FIG. 1 shows a schematic block diagram of a generalized, conventional paper channel.

FIG. 1 shows conventional paper channel 10. Channel 10 includes: symbol input 12, bitmap generator 14, printer 16, substrate 20, and imager 22.

Symbol input 12 can be any convenient source of input signals which specify symbols to be printed, for example, a keyboard, a tape or disk drive, or the output of another channel. The input signal can not only specify a particular symbol (e.g. the letter "c") but also include font selection and formatting information which will modify the printed symbol selected to represent the symbol. (e.g.: c (lower case)—C(upper case)—C(upper case, italic)—C(upper case, bold)-c(lower case, underlined)

In one embodiment of the subject invention, paper channel 10 may comprise a bar code printer. A bar code consists of an array of modules that are different optical densities. For example, a commercially available bar code, which is marketed under the trade name "DataMatrix," consists of a two-dimensional array composed of white and black square modules. One way to describe a "DataMatrix" bar code is as an array of symbols selected from a set consisting of two symbols: a black module and a white module. The symbols described herein thus include bar codes and other printed encoding schemes in addition to alphanumeric characters and the like.

Bitmap generator 14 codes the input signal to send output B representative of selected nominal symbol designs (i.e. "bitmaps") to printer 16. (As noted above this output can be transformed to a bitmap having the same resolution as imager 22 without loss of generality.).

In a preferred embodiment, the subject invention employs a mapping of the graphical design of the character or symbol to a bitmap with the same resolution as the image. Each symbol has an ideal graphical design. (Depending upon the application, the ideal design can be either a continuous graphic design, such as design 47, or an input bitmap, such as is illustrated by pattern 48.) In a preferred embodiment, the ideal graphical design is divided into a grid with the same resolution as the imager. If a given element of the grid, corresponding to lattice site j, is more than half covered with the high optical density part of the symbol design, then the field $b_c^j$ is set to 1. Otherwise it is set to 0. Alternatively, the field $b_c^j$ is a continuous variable set the percentage of the grid rectangle that is covered with the high optical density of the graphical design. Those skilled in the art will recognize that many similar schemes can generate a bitmap representative of the graphic design with resolution equal to the imager resolution.

Printer 16 can be any convenient form of print engine such as an ink jet printer or a laser printer. Printer 16 responds to the output of bitmap generator 14 to print symbols which approximate, more or less closely, the nominal symbol design represented by the bitmap on substrate 20, which is typically one or more sheets of paper, though printing on any suitable surface, such as plastic sheets, is within the contemplation of the subject invention.

Sheets 20 are then (possibly after substantial delay and/or transport over substantial distance) scanned by imager 22 to produce an output S for further processing as described above. Typically imager 22 is a raster scanner and output S is a time sequence of signals corresponding to sites in a symbol lattice, hereinafter sometimes "image pixels", but imager 22 can also be a "camera" which captures an image of a symbol, or larger portion of the print field with a matrix of detectors and output S is an array of parallel signals corresponding to lattice sites.

Output S is then input to recognition system 24 to form printed symbol communications channel 26 which produces an output of recovered symbols R approximating the symbol input from symbol input 12, as will be discussed further below.

Generally, channel 10 is noiseless from symbol input 12 to input B to printer 16. That is, a particular input symbol specifies a particular, corresponding output bitmap b, and a particular output b determines a corresponding input symbol, possibly with corresponding format or font selection information. Thus, the information capacity of channel is limited by the characteristics of printer 16, ink 18, substrate 20 and imager 22.

In the discussion below, input B will be considered to be a lattice random variable which takes on particular values $b_c$ representative of the bitmap for symbol c. The value of $b_c$ at the jth lattice site, hereinafter sometimes bitmap pixel, is $b_c^j$. S will be considered to be a lattice random variable which takes on particular values $s_i$ representative of the ith image selected from the set of all possible images. The value of $s_i$ at the jth lattice site, hereinafter sometimes image pixel, is $s_i^j$.

Channel 10 can also include test pattern generator 24 which inputs test pattern bitmaps designed to reveal local distortions introduced by printer 16, ink 18, substrate 20, or imager 22 to printer 16. In other embodiments bitmap generator 14 can generate test pattern bitmaps.

Figure 2:
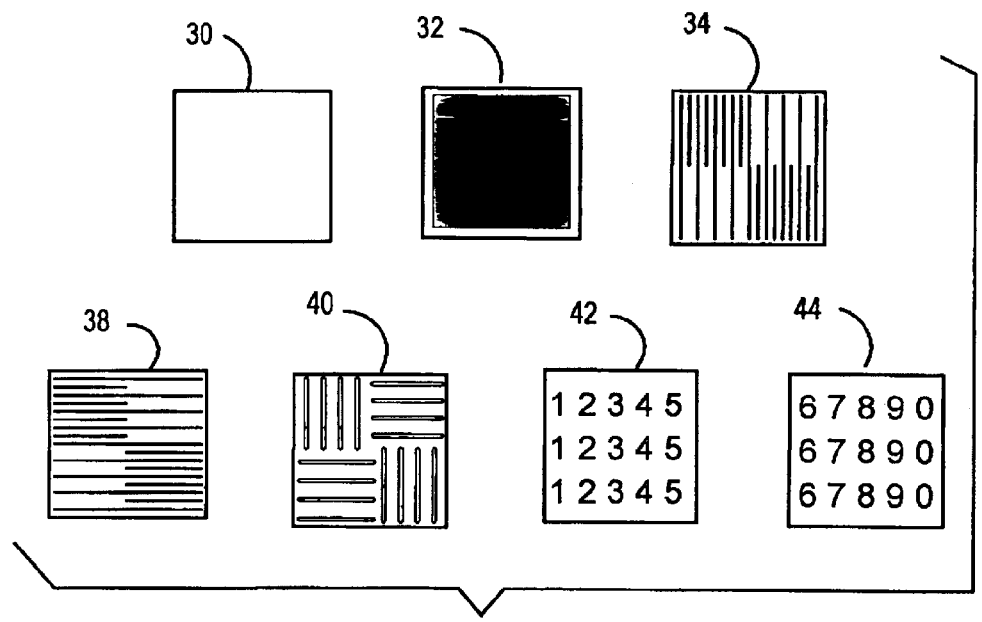
FIG. 2 shows a group of test patterns used in the determination of parameter values for a statistical model of a paper channel in accordance with the subject invention.

FIG. 2 shows a number of possible test patterns illustrative of test bitmaps $tb_c$ which can be used to develop a statistical model describing paper channel 10. Test pattern 30 is an "all white" pattern corresponding to a null test bitmap where no pixel is asserted. Test pattern 32 is an "all black" pattern corresponding to a test bitmap where every pixel is asserted. Patterns 34 and 38 are parallel sets of interleaved, relatively thin bars and half bars, with vertical and horizontal orientation respectively. Pattern 40 is an arrangement of relatively thick half bars in vertical and horizontal orientations. Patterns 30 through 40 are typical of test patterns that have been developed by those skilled in the to clearly show typical local print distortions. These or other similar test patterns which are known to, or can easily be designed by, those skilled in the art are input to printer 16, and the resultant image signals s are analyzed to estimate parameters for a statistical model describing channel 10 in a manner which will be more fully described below. Similar test patterns are often used by those skilled in the art of evaluating print quality. Typical print quality parameters are modulation and graininess, print growth, edge roughness and waviness.

FIGS. 42 and 44 show test patterns used in another embodiment of the subject invention. Patterns 42 and 44 are arrangements of a subset, which can be the full set, of test symbols generated from corresponding test bitmaps $tb_c$ and selected from a set of symbols to be printed. Since it has been found that print symbol distortions are local (i.e. the probability of a particular image signal $p(s_i|b_c)$ being generated by a symbol printed in response to bitmap $b_c$, at a particular location in the print field (hereinafter sometimes "page") is substantially independent of other symbols printed on the page) test symbols which are repeated in test patterns such as patterns 42 and 44 can be considered as repeated instances of the same test symbol.

The selected test patterns should reflect the typical features of the symbols employed in the channel.

Figure 3:
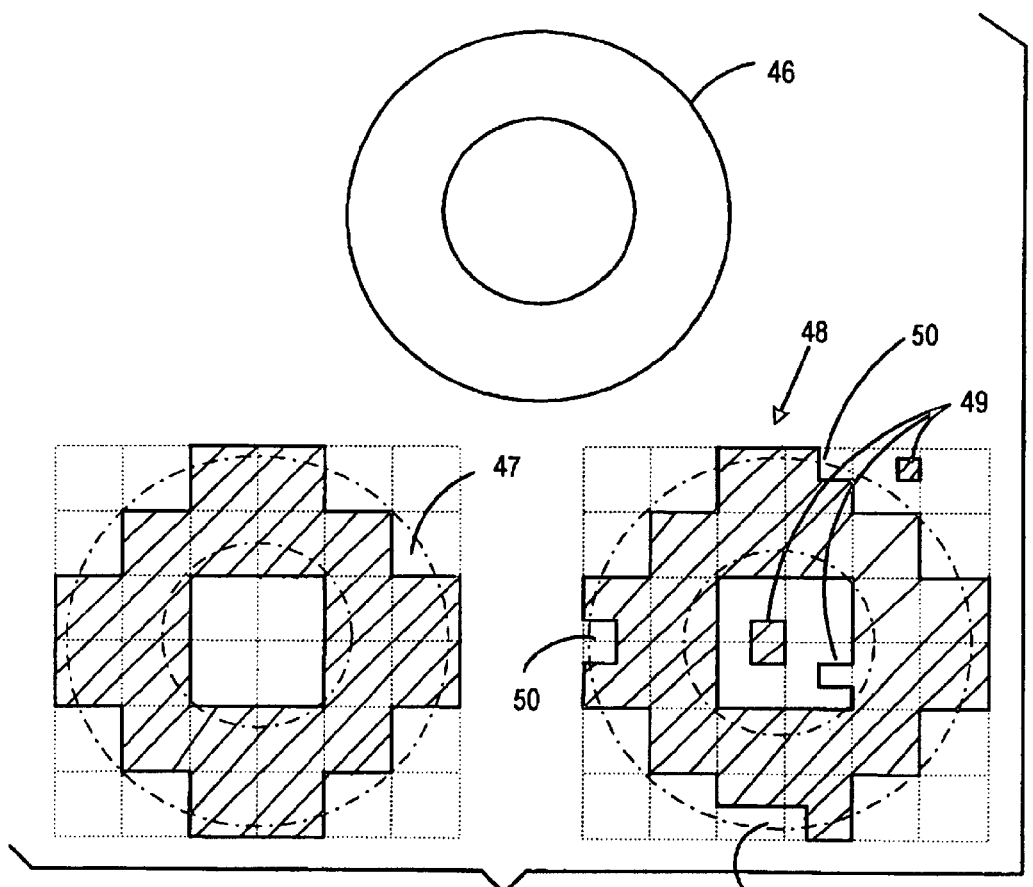
FIG. 3 shows various representations of a symbol.

FIG. 3 illustrates various representations of a typical symbol. Design 46 is an ideal graphical symbol design such as is produced by a typographic designer. Pattern 47 illustrates an input bit such as would be stored in bitmap generator 12. Pattern 48 illustrates an image signal captured by imager 22. Note that pattern 48 does not necessarily have the same resolution as pattern 47 and differs from pattern 47 by the random addition of pixels 49 and dropping of pixels 50. The probability distribution of images produced by a given input bitmap (e.g. pattern 48 produced by pattern 47) can be described by a local statistical paper channel model as described below. The paper channel model provides a mechanism for deriving the relationship between the paper channel information capacity and print quality parameters.

This relationship is independent of the recognition process. The ability to separate between limitations of the paper channel process and limitations of the recognition process allows sequential rather than simultaneous optimization of the two channels. When a recognition system is tuned to interpret captured images from a first paper channel of a first application, and is then employed to interpret captured images from a second paper channel of a second application, it usually under performs. Fault may be found with the second paper channel, when in reality the fault is with an unmatched recognition system. For example, if the recognition system employs a fixed binarization threshold, and the new substrate has a background optical density that is too close to the threshold, then the system will fail to perform well, even though the new paper channel, excluding the recognition process, may have sufficient information capacity.

The information capacity l(B,S) of paper channel 10 is:

I(B,S)=H(B)−H(B|S), where H(B) is the entropy, or information capacity, of input B to printer 16 (i.e. the amount of information which can be conveyed by selection among various particular values $b_c$ of B), and H(B|S) is the conditional entropy of B assuming S. I(B,S) can be considered as the average amount that uncertainty about particular values of input B is reduced by knowing the values of output S produced. Thus, H(B|S) is the information loss of channel 10. i.e., the amount by which channel capacity I(B,S) is less then H(B) the information capacity of input B.

The information capacity of B is:

$$H(B) = -\sum_c p(b_c) \cdot \log_2(p(b_c));$$

where $$\sum_c$$

represents summation over all bitmaps $b_c$, and $p(b_c)$ is the probability of $b_c$. (Note: hereinafter all logs are base 2 unless otherwise stated.) Assuming that the distribution of B is uniform, that is $p(b_c)=1/N_c$ where $N_c$ is the number of symbols, then $$H(B) = -\sum_{c=1}^{N_c} (1/N_c) \cdot \log(1/N_c) = \log(N_c).$$

The information capacity of channel 10 is thus determined by the conditional entropy, or information loss H(B|S). A uniform distribution with each character having probability 1/Nc maximizes the information per character in the message. The information capacity usually differs from symbol to symbol. A non-uniform distribution of the probability for a symbol, favoring symbols with higher channel information capacity, maximizes the channel capacity. Other non-uniform distributions are determined by the message space and the encoding scheme of the particular application. While a uniform distribution is not necessary, it is a reasonable assumption in the absence of information about the statistics of the source, i.e., the distribution of B, and will be made for the following analysis unless otherwise stated.).

Figure 4:
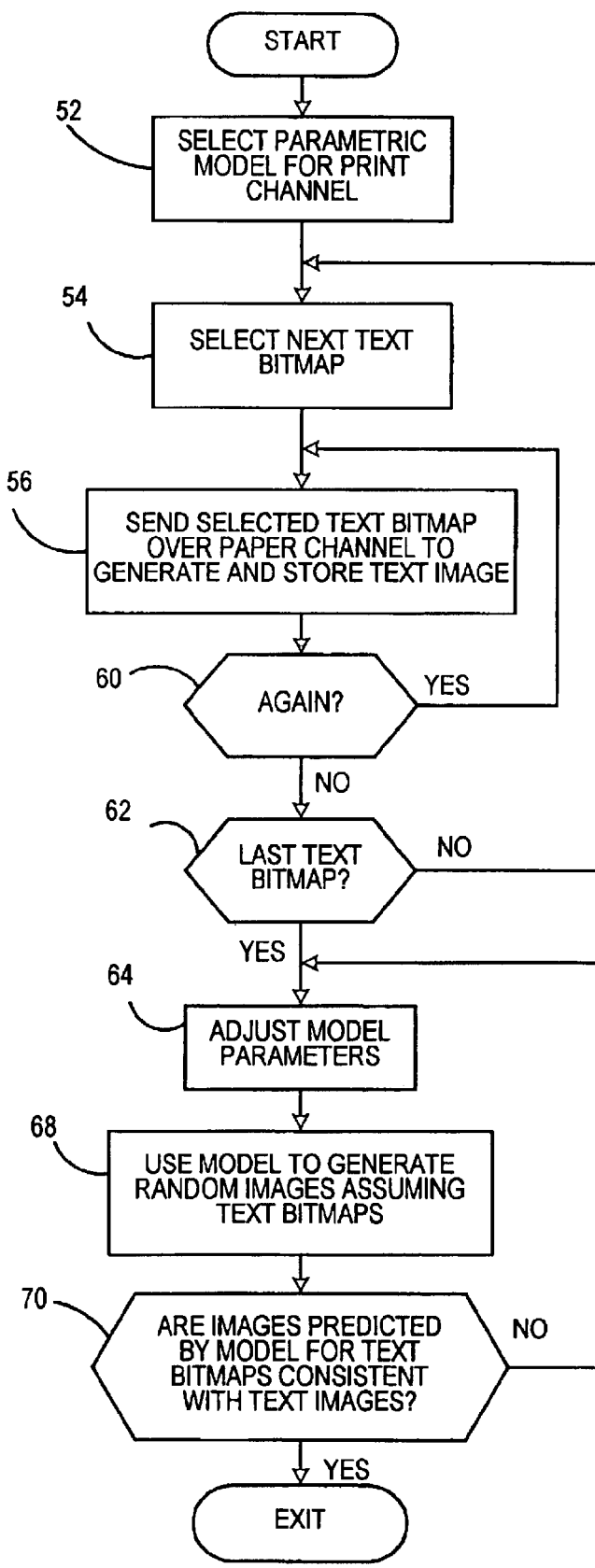
FIG. 4 shows a flow diagram of the determination of parameter values for a statistical model of a paper channel in accordance with the subject invention.

To evaluate channel 10, it is first necessary to characterize channel 10 by developing a model which describes its operation (more particularly, which describes the operation from input of signal B through output of signal S, since selection of values $b_c$ is assumed to be noiseless.) FIG. 4 shows the development of such a model in accordance with the subject invention.

At step 52, a general, parametric, statistical model suitable to describe the operation of channel 10 is selected. The statistical relationship between input bitmap and the image is local in two-dimensions. The probability distribution for optical density of a given printed symbol pixel is related only to neighboring bitmap pixels $b_c^j$ and there is no long-range interaction between different parts of the image. Thus, the joint probability distribution for two sufficiently separated image pixels $s_i^j$ is the product of their individual distributions. One bitmap pixel $b_c^j$ modifies the probability distribution of several nearby image pixels $s_i^j$, and the probability distribution for each image pixel is modified by the values of several bitmap pixels. These modifications result, in combination with properties of paper 20, printer 16 and imager 22, in image quality characteristics, such as print growth, background noise, modulation, contrast, and blur. These image quality characteristics are common descriptors of print quality and image quality. A parameterized statistical model can describe the probabilistic relationship between the input bitmap B and output S. The model parameters are determined by matching the statistical quality characteristics of a set of test images, as will be described further below.

In a preferred embodiment of the subject invention, a model analogous to the energy function of generalized two-dimensional Ising model is an appropriate choice. The Ising model used in the preferred embodiment described below, produces a statistically distributed, locally interacting, binary random variable, or spin, on each site of a two-dimensional lattice in the presence of a field on the lattice, to model threshold, binary image pixels $s_i^j$ produced by bitmap B. As noted above, before applying the model, a coordinate transformation is applied to bitmap B to line it up with the image. An Ising model can have several parameters. The preferred model presented here has four parameters. Transformed bitmap B is converted to a position-dependent applied field that has a value $b_{ink}$ if the corresponding image pixel should be dark and $b_{paper}$ if the corresponding image pixel should be light. The tendency for neighboring pixels to assume the same value is described by a nearest neighbor coupling factor J. Each image pixel $s_i^j$ assumes a value +1 for a dark image pixel and −1 for a light image pixel.

In the preferred model a function, analogous to the statistical mechanical energy for Ising model spins, is:

$$E[s_i \mid b_c] = \sum_j \left( L \cdot b_c^j \cdot s_i^j + J \sum_{nn} s_i^j \cdot s_i^{j'} \right)$$

where the second sum is over nearest neighbors of the point j and J is a nearest neighbor coupling factor and L is a coupling factor between bitmap b and image s which will be described further below. The conditional probability for a given output $s_i$, given an applied field $b_c$ is:

$$p[s_i \mid b_c] = \frac{\exp(-E[s_i \mid b_c])}{\sum_{i'} \exp(-E[s_{i'} \mid b_c])};$$

where $$\sum_{i'}$$

represents summation over all particular values s for output S.

In other embodiments of the subject invention, models retain the form described while the values of $b_c^j$ may be a binary (to model monotone images), an integer (to model discrete gray-scale), a continuous variable (to model gray-scale), or a vector value (to model discrete or continuous color gray-scale. Similarly the value of $s_i^j$ may be a binary, an integer, a continuous variable, or a vector value.

In general, more complicated models having more or more complex parameters are required to model more accurately print channel characteristic;, however, the preferred model accounts for important typical image characteristics without undue computational complexity. It is believed that such models can readily be developed by those skilled in the art from the descriptions set forth herein and use of other models is within the contemplation of the subject invention. These models will look very similar to the above binary model, with additional terms proportional to powers of the $s_i$ on one site and terms proportional to products of powers of $s_i$ on neighboring sites, and for vector value s, terms proportional to products of powers of the components of s on one or neighboring sites. These terms can similarly be calculated by matching print quality characteristics. In a paper channel with reasonably good print quality, there is no long range correlation introduced into the image; the image in one area is independent of the image a few pixels away. Therefore, it will not be necessary to include a large number of terms to obtain a good model of the paper channel.

Typically, appropriate forms of models will have been previously determined, and a person skilled in the art will select the general form of model from knowledge of the type of channel to be evaluated.

Then, at 54, the next test bitmap $tb_c$ is selected and, at 56, sent over channel 10 to produce a test output $ts_i$. At 60, it is determined if the selected test bitmap is to be sent again to generate another particular output image $ts_i$. If so, the process returns to 56; and otherwise, at 62, determines if this is the last test bitmap. If not, the process returns to 54.

Otherwise, at 64, the model parameters are adjusted to reflect the test output images $ts_i$. The preferred model reproduces many of the image quality characteristics of a typical printer-camera system, such as print growth, background noise, modulation, contrast, and blur. These image quality characteristics are common descriptors of print quality and image quality. The distribution of these or other print quality characteristics can be determined by examination of the test output images $ts_i$. The three parameters J, $b_{ink}$ and $b_{paper}$ can be determined by adjustment to match print quality characteristics of test outputs $ts_i$. A large positive value of $b_{ink}$ produces a uniform dark image. A large negative value of $b_{paper}$ produces a clean background. A large value of J produces strong correlation between neighboring sites, so small white or black islands or details in the bitmap tend to disappear in the image. An asymmetry between $b_{paper}$ and $b_{ink}$ combined with a comparable value of J results in print growth or print shrinkage. By considering these properties of the model and considering the print quality characteristics of test outputs $ts_i$, a person skilled in the art can approximate model parameter values which will describe channel 10.

A preferred method is to calculate correlations within images $s_i$ and between images $s_i$ and bitmaps $b_c$. a good model will reproduce the correlations found experimentally, and deviations can be used to correct the model parameters.

It should be noted that test bitmaps $tb_c$ and test output images $ts_i$ are conceptually identical to bitmaps $b_c$ and output images $s_i$ except that in some cases, they cover a larger portion of the page. In other cases, such as test patterns 42 and 44, a group of test bitmaps each covering a part of the page is sent through channel 10 as a single pattern. Because the dependence of the output image $s_i$ on bitmap $b_c$ is local, test bitmaps $tb_c$ such as are illustrated in test patterns 42 and 44 can be used to estimate model parameters which are also local in two-dimensions.).

A particular example where the model parameters vary with position in the image is the common case where the lighting is not uniform. Non-uniform lighting produces reduced contrast in areas that are under or over illuminated. Over illumination produces blooming and narrowing of dark areas. Under illumination produces growth of dark areas. This effect can be modeled by multiplying the bitmap field $b_c^j$ by a selected illumination field $L_j^i$ selected from a random variable L representing the variation in illumination. Generally, L will exhibit long wavelength variation. If L is distributed according to the variation in illumination, then the model will exhibit local characteristics comparable to the noted growth and shrinkage of dark areas.

Another type of local random variation is preprinting or texture on the substrate. Those skilled in the art will recognize that other similar types of position dependent variability can be included in the model.

At 68 the model is then used to generate random images assuming test bitmaps $tb_c$, preferably using the Metropolis Monte Carlo algorithm. These computed images are then compared with the test output images $ts_i$ and if they are consistent the process ends. Otherwise it returns to 64 to further adjust the model parameters. The comparison is consistent if the distribution of print quality characteristics is substantially similar for the computed image an the actual test output images $ts_i$. (The Metropolis Monte Carlo algorithm is a known algorithm for generation of random results for a given statistical model and need not be discussed further here for an understanding of the subject invention.).

Once satisfactory model parameters have been determined, the information loss and capacity for channel 10 are given by:

$$I(B,S)=H(B)-H(B|S)$$

$$H(B) = -\sum_c p(b_c) \cdot \log(p(b_c));$$

where $N_c$ is the number of symbols.

The information loss, H(B|S), is the average over all output values $s_i$ of the conditional entropy of B given that $S=s_i$, given by:

$$H(B|S) = \sum_i p(s_i) \sum_c p(b_c|s_i) \cdot \log p(b_c|s_i)$$

To evaluate H(B|S), $p(s_i)$ is given by:

$$p(s_i) = \sum_c (p(s_i, b_c)) = \sum_c p(s_i|b_c) \cdot p(b_c);$$

and $p(b_c|s_i)$ is given by:

$$p(b_c|s_i) = \frac{p(s_i|b_c) \cdot p(b_c)}{\sum_{c'} p(s_i|b_{c'}) \cdot p(b_{c'})}; \text{ and, assuming } p(b_c) = 1/N_c, \quad (1)$$

$$p(b_c|s_i) = \frac{p(s_i|b_c)}{\sum_{c'} p(s_i|b_{c'})} \quad (2)$$

Figure 5:
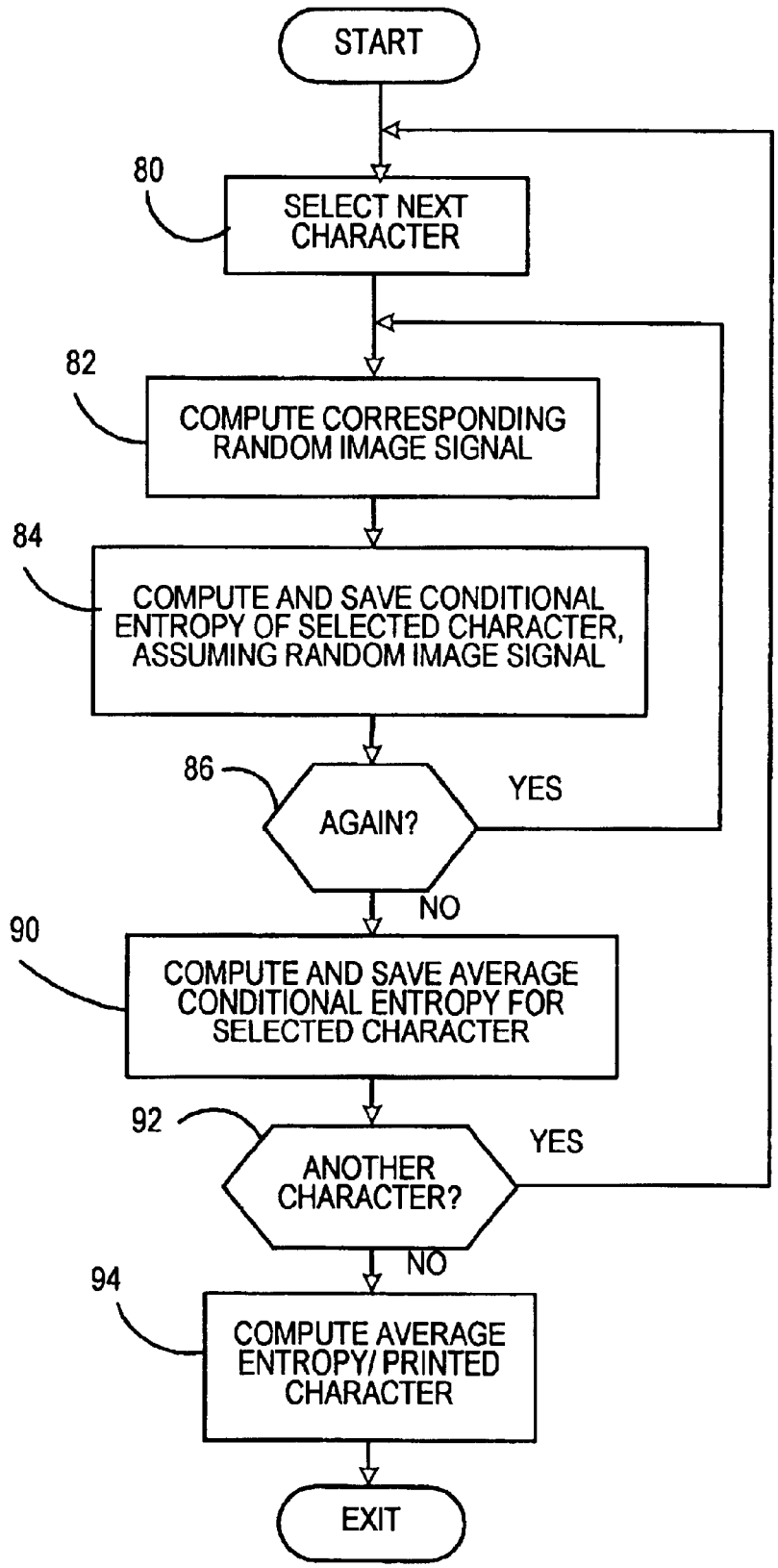
FIG. 5 shows a flow diagram of the determination of estimated conditional entropy (i.e. average information loss per symbol) for a paper channel.

Thus, it will be apparent that H(B|S) and, thus, I(B,S) can be derived from the model of FIG. 4 using (2) where $p(b_c)$ is assumed constant and (1) where $p(b_c)$ is not constant. However, depending on the statistical mechanical model for $s_i$, analytic calculation of $p(s_i)$ may be difficult. Every possible image has at least some very small probability of arising from any symbol, so the sums over i can have many terms. An alternative statistical approach is to estimate the information loss based on the statistical model derived from image quality parameters as shown in FIG. 5.

At 80, the next symbol from the set of symbols to be printed is selected. Note that, in general, all possible symbols that may be printed in the future are not known. However, those skilled in the art will be able to select a set of $N_c$ symbols which will be sufficient to evaluate channel 10, at least for particular applications of interest. These $N_c$ symbols are an integral part of the channel under evaluation. If a second set of symbols is employed, then a second channel is created and must be evaluated. The same model parameters can be employed if the printer, substrate, ink and imager are the same, and the new font characteristics are consistent with the test patterns used in the first channel. Similarly, if a barcode bitmap generator is modified, the corresponding paper channel must be re-evaluated. Examples of such bitmap modification include changing the size of the modules, changing the relative size of black and white modules, or changing the print density by varying spot size or density.

At 82, a random output image $s_i$ corresponding to bitmap $b_c$ for the selected symbol is computed and saved, preferably using the Metroplis Monte Carlo algorithm. At 84, the conditional entropy for the selected symbol is computed as:

$$H(b_c|s_i) = p(b_c|s_i)\log(p(b_c|s_i)); \text{ where } p(b_c|s_i) \text{ is given by:}$$

$$p(b_c | s_i) = \frac{p(s_i | b_c)}{\sum_{c'} p(s_i | b_{c'})},$$

as above.

If another random output is to be computed then, at 86 the process returns to 82. At 90, the average of the conditional entropies for the selected symbol is computed and saved. Preferably, about 100 computed values of outputs $s_i$ will be used to obtain a sufficiently accurate measure of information loss for the selected symbol. The number of samples of s depends on the desired accuracy of the measurement, but even a few samples are sufficient to get an estimate of the capacity.

If, at 92, another symbol is to be evaluated, the process returns to 80. Otherwise, at 94 the average information loss per printed symbol is computed and the process ends.

If another non-uniform distribution for B is assumed then equation (1) can be used at 84 to estimate the conditional entropy as:

$$p(b_c | s_i) = \frac{p(s_i | b_c) \cdot p(b_c)}{\sum_{c'} p(s_i | b_{c'}) \cdot p(b_{c'})};$$

using the assumed values for $p(b_c)$, and the average computed at 94 is weighted in accordance with the assumed distribution of B.

Either of the methods described above, analytic or statistical, provides a measure or estimate for the information loss per symbol and information capacity in generalized paper channel 10 which is independent of the effects of any recognition algorithm or error correction code which is used. These values provide a valuable figure of merit which can be used, for example, to evaluate bar code printers to be used in a communications channel which includes a paper channel without need to separate out he effects of recognition algorithms and/or error correction codes.

Figure 6:
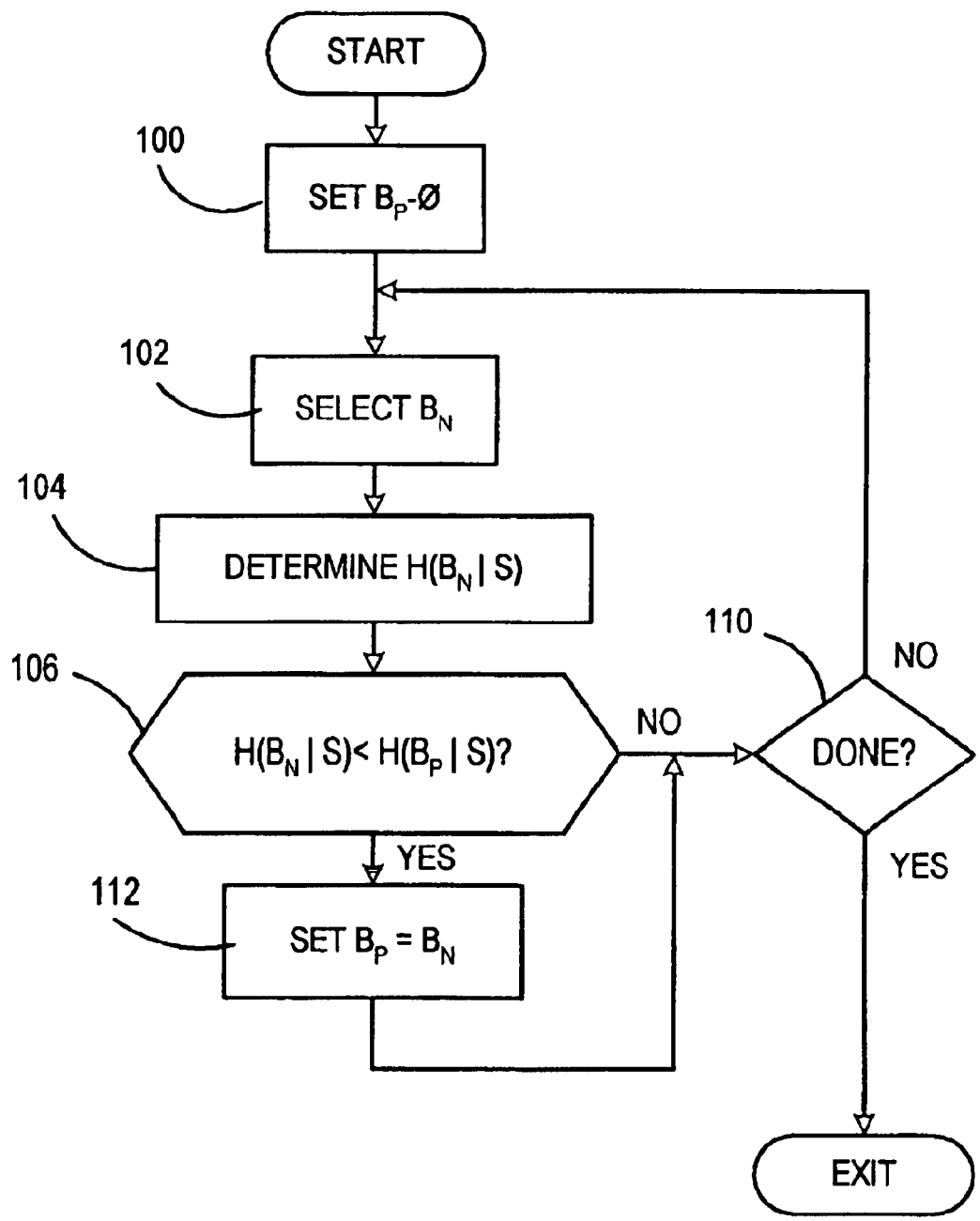
FIG. 6 shows a flow diagram of a method for selecting a set of bitmaps, or nominal symbol designs, to reduce or minimize the conditional entropy of a paper channel.

The method of the subject invention can also be used to modify the design or select particular components for channel 10 (i.e., particular choices for printer 16, ink 18, substrate 20 and imager 22, or for the set of input bitmaps B.) FIG. 6 shows an application of the subject method to the design of input bitmaps B which is optimized for a particular physical component of channel 10; i.e., printer 16, ink 18, substrate 20 and imager 22.

At 100, first set of "previous" bitmaps $B_P = \emptyset$ having null information content, (e.g. for all c, $b_c$=0) so $I(B_P,S)=H(B_P)-H(B_P|S)=0$, and the information loss $H(B_P|S)$ is maximum.

At 102, a next bitmap to be evaluated $B_N$ is selected. $B_N$ can be selected from an existing group of bitmaps or can be generated by incremental changes to $B_P$. Such changes can be either small random changes or can be guided by the knowledge and experience of a person skilled in the typographic arts.

At 104, the information loss for the combination of input bitmaps $B_N$ and the physical channel under consideration $H(B_N|S)$ is determined in a manner described above. (It should be noted that when evaluating sets bitmaps B in this manner, a representative subset, which can be the full set, of bitmaps $b_c$ can comprise the test bitmaps. If possible, it is better to use a complete set. Obviously, for a bar code such as commercially available barcodes marketed under the trademarks "PDF417" or "DataMatrix", it is not possible to test all bar codes, and a representative subset must be taken. For example, a small set of bar code modules (say 2 by 2) with a representative surrounding set of "guard" modules.).

At 106, it is determined if: $H(B_N|S) < H(B_P|S)$; and if not, at 110, it is determined if the evaluation of input bitmaps is done. The process can be considered done if pre-selected criteria are met. For example, all of an existing group of bitmaps to be considered have been evaluated, a predetermined number of input bitmaps $B_N$ have been evaluated, a predetermined level of information loss has been reached, or further incremental changes do not produce improvement (i.e. a local optimum has been reached). If the process is not done, it returns to 102. If $H(B_N|S) < H(B_P|S)$; then, at 112 $B_P$ is set equal to $B_N$ and the process returns to 110. When the process is input bitmap $B_P$ will be optimal for use with the physical channel under consideration in accordance with the pre-selected criteria.

Those skilled in the art will recognize that the method of the subject invention can be used in a substantially similar process to optimize the selection or modification of the physical components of channel 10. The method of the subject invention can also be used to identify the contribution of a recognition system to the information loss in a printed symbol communications channel.

Returning to FIG. 1, if $r_i$ is a recovered symbol from output R of recognition system 24, then a person skilled in the art can easily determine $p(b_c|r_i)$; and thus, H(B|R), the information loss in complete printed symbol communications channel 26, from the error statistics for printed symbol communications channel 26. Subtracting H(B|S), the information loss in paper channel 10 gives H(S|R), the information loss in recognition system 24. This knowledge can be used to avoid problems such as the inadvertent degradation of paper channel 10 to match a suboptimal recognition system 24, discussed above.

While the Ising model is simple, sums over the values of spins on a large lattice are difficult. An alternative "Gaussian" model allows analytic calculation. In this model $$E[s_i | b_c] = \sum_j \left( c \cdot (s_i^j)^2 + b_c^j \cdot s_i^j + \sum_{nn} d \cdot (s_i^j - s_{nn}) \right)$$

where the sum over nn is the sum over neighbors of site j. The expression for the probability density is $$p(s_i | b_c) = \frac{\exp(-E(s_i | b_c))}{\int_{s_i'} \exp(-E(s_i' | b_c))}$$

The integrals over the values of s can be calculated analytically using a Fourier representation. As described above, the model parameters are determined by matching print quality parameters of captured experimental images to those produced by the model.

The embodiments described above and illustrated in the attached drawings have been given by way of example and illustration only. From the teachings of the present application, those skilled in the art will readily recognize numerous other embodiments in accordance with the subject invention. Particularly, other modifications of various indicia printed with different geometries will be apparent. Accordingly, limitations on the subject invention are to be found only in the claims set forth below.

What is claimed is:

1. A method for measuring information loss, or conditional entropy, of a paper channel, said paper channel comprising:

(a) a symbol input defining symbols to be printed;

(b) a bitmap generator responsive to said symbol input to generate bitmaps representative of corresponding input symbols;

(c) a printer responsive to said bitmap generator to print on a substrate symbol images substantially determined by said bitmaps; and (d) an imager to capture said images from said substrate and generate corresponding image signals, said method comprising the steps of:

i) selecting a general, parametric, statistical model for said paper channel;

ii) selecting a plurality of test bitmaps;

iii) transmitting said test bitmaps through said paper channel to obtain a set of test image signals for each of said symbols, each of said sets containing at least one test image signal;

iv) adjusting parameters of said model so that image signals predicted by said model for said set of test bitmaps substantially conform to said sets of test image signals, whereby a particular parameterization of said model substantially accurately describing said paper channel is obtained; and v) determining an estimate for the information loss of said channel in accordance with said particular parameterization.

2. A method as described in claim 1 wherein said model is defined in terms of a random variable S representative of a scanned image on a lattice corresponding to a print field and a second random variable B corresponding to bitmaps input to said paper channel; and wherein said random variable S takes on values $s^j_i$ at points j in said lattice, where i labels an image selected from a set of possible images, and wherein said random variable B takes on values $b^j_c$ at points j in said lattice, where c labels a symbol selected from a set of said symbols to be printed.

3. A method as described in claim 2 wherein said model is analogous to an Ising model for the distribution of spin on a two-dimensional lattice in the presence of a field.

4. A method as described in claim 3 wherein said model has the form:

$p(s|b_c) = \exp(-E(s|b_c))/\exp(\Sigma_{s'}(-E(s'|b_c)))$; where $p(s|b_c)$ is the conditional probability that said random variable S will take on the particular value s assuming that said random variable B takes on the particular value $b_c$ corresponding to the input of symbol c, and $\Sigma_{s'}$ represents summation over all values of s; and where:

$$E(s|b_c) = -\sum_j \left( b^j_c \cdot s^j + J \cdot \sum_{nn} s^j \cdot s^{j'} \right);$$

where J is a coupling factor and $$\sum_{nn}$$

represents summation over nearest neighbors $s^{j'}$ in said lattice.

5. A method as described in claim 1 wherein said values $b^j_c$ and $s^j_i$ are binary values, and said image is a monotone image.

6. A method as described in claim 1 wherein said values $b^j_c$ and $s^j_i$ are integer values, and said image is a discrete gray-scale image.

7. A method as described in claim 1 wherein said values $b^j_c$ and $s^j_i$ are continuous values, and said image is a gray-scale image.

8. A method as described in claim 1 wherein said values $b^j_c$ and $s^j_i$ are vector values, and said image is a color gray-scale image.

9. A method as described in claim 1 wherein said model can be calculated analytically.

10. A method as described in claim 1 wherein said test bitmaps correspond to a selected subset of said symbols to be printed.

11. A method as described in claim 1 wherein said test bitmaps comprise at least one test pattern designed to show local distortions of said paper channel.

12. A method as described in claim 1 wherein said parameters vary as functions of position in a print field or page.

13. A method as described in claim 1 wherein step e) comprises the further steps of:

a) selecting one of said symbols to be printed from at least a subset of said symbols to be printed, and, for a predetermined number of iterations;

a1) computing a random value for an image signal in accordance with a conditional probability distribution for said image signals assuming said selected symbol, said conditional probability distribution being determined by said particular parameterization;

a2) for said selected symbol determining, in accordance with said particular parameterization, a conditional probability of said selected symbol, assuming said computed random output image signal;

b) over said predetermined number of iterations, determining the mean conditional entropy, or information loss in transmitting said selected symbol over said paper channel, as a function of said conditional probabilities determined in sub-step f2)

c) repeating steps a and b for all remaining ones of said subset of symbols to be printed; and d) averaging said conditional entropies determined in step g over all of said test symbols to determine an approximate measure of the channel entropy, or information loss in bits per printed symbol.

14. A method for selecting or modifying a design for, or composition of, a component of a paper channel, said paper channel component being; a bitmap generator responsive to said symbol input to generate bitmaps selected from a stored set of bitmaps and representative of corresponding input symbols, a printer responsive to said bitmap generator to print on a substrate symbol images substantially determined by said bitmaps, an imager to capture said images from said substrate and generate corresponding image signals, said substrate, an ink use by said printer, or said set of bitmaps, said method comprising the steps of:

a) determining an average information loss per symbol when a first design or composition is used for said component;

b) comparing said average information loss per symbol for said first design or composition with a previously determined average information loss per symbol when a previous design or composition is used for said component; and c) selecting whichever of said designs or compositions has the lower average information loss per symbol.

15. A method as described in claim 14 comprising the further steps of:

d) substituting said selected design or composition for said previous design or composition;

e) substituting a next design or composition for said first design or f) repeating steps a through e until predetermined conditions are satisfied.

16. A method as described in claim 15 wherein said next design or composition is selected from a predetermined group of designs or compositions.

17. A method as described in claim 15 wherein said next design or composition is obtained by modifying said design or composition selected in step c.

18. A method as described in claim 14 wherein said average information loss is determined by the further steps of:

a) selecting a general, parametric, statistical model for said paper channel;

b) selecting a plurality of test bitmaps representative of at least a subset of said symbols to be printed;

c) transmitting said test bitmaps through said paper channel to obtain a set of test image signals for each of said symbols, each of said sets containing at least one test image signal;

d) adjusting parameters of said model so that image signals predicted by said model for said set of test bitmaps substantially conform to said sets of test image signals, whereby a particular parameterization of said model substantially accurately describing said paper channel is obtained;

e) determining an estimate for said average information loss in accordance with said particular parameterization.

19. A method as described in claim 18 wherein said model is defined in terms of a random variable S representative of a scanned image on a lattice corresponding to a print field and a second random variable B corresponding to a bitmap input to said paper channel; and wherein said random variable S takes on values $s^j_i$ at points j in said lattice, where i labels an image selected from a set of possible images, and wherein said random variable B takes on values $b^j_c$ at points j in said lattice, where c labels a symbol selected from a set of said symbols to be printed.

20. A method for measuring information loss, or conditional entropy, of a paper channel, said paper channel comprising; a symbol input defining symbols to be printed, a bitmap generator responsive to said symbol input to generate bitmaps representative of corresponding input symbols, a printer responsive to said bitmap generator to print on a substrate symbol images substantially determined by said bitmaps, and a imager to capture said images from said substrate and generate corresponding image signals, said method comprising the steps of:

a) selecting a general, parametric, statistical model for said paper channel;

b) selecting a plurality of test bitmaps;

c) transmitting said test bitmaps through said paper channel to obtain a set of test image signals for each of said symbols, each of said sets containing at least one test image signal;

d) adjusting parameters of said model so that image signals predicted by said model for said set of test bitmaps substantially conform to said sets of test image signals, whereby a particular parameterization of said model substantially accurately describing said paper channel is obtained; and e) analytically determining said information loss in accordance with said particular parameterization.

* * * * *